Jan. 14, 1936.  J. N. HASSE  2,027,821
CHANGE OF DIRECTION INDICATOR FOR MOTOR VEHICLES
Filed May 26, 1934
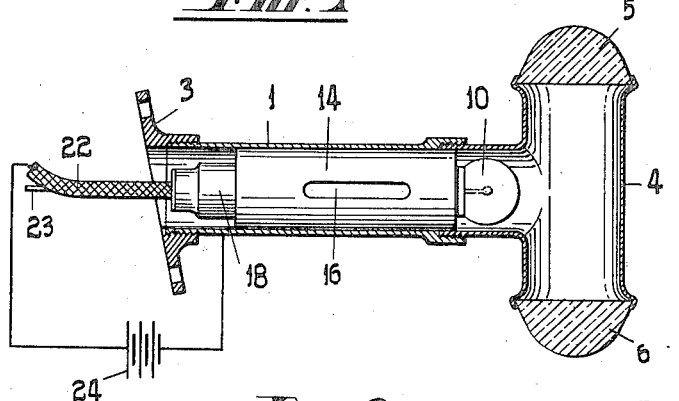
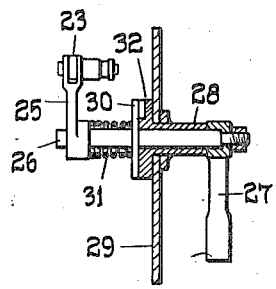
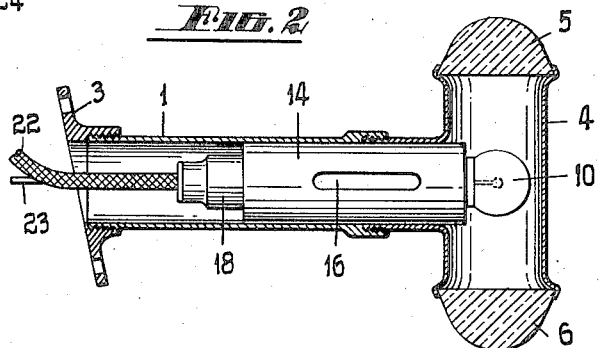
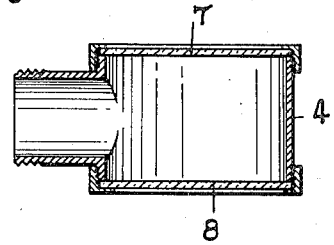
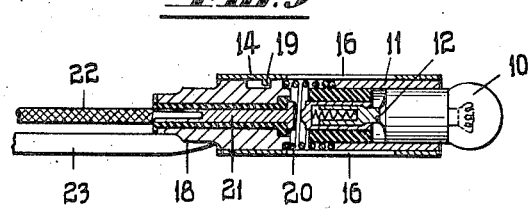
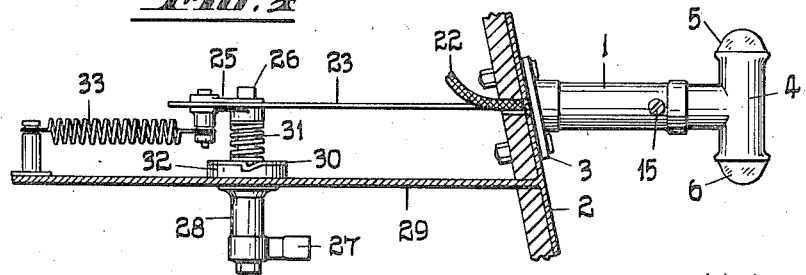
John Nelson Hasse
INVENTOR
By Otto Munk
his ATTY.

Patented Jan. 14, 1936

2,027,821

UNITED STATES PATENT OFFICE 2,027,821

CHANGE OF DIRECTION INDICATOR FOR MOTOR VEHICLES

John Nelson Hasse, St. Peters, South Australia, Australia

Application May 26, 1934, Serial No. 727,602
In Australia March 12, 1934

2 Claims. (Cl. 177—329)

This invention relates to an indicator for motor vehicles by means of which the driver of the vehicle can signal to motorists, pedestrians or others his intention to turn.

The indicator is of the type which is mounted upon the side or mudguard of the vehicle and which when operated to indicate a turn displays a light of characteristic colour, such as red, clearly visible from front and rear.

The primary object of the invention is to so construct the signal, that the turn-indicating colour cannot appear accidentally should the light of a passing vehicle or the like strike it. A further object is to so construct it that it will be simple in operation and will have no external moving parts.

According to the preferred form of my invention a tubular member, having at its outer end a housing in which are front and rear uncoloured transparent or translucent windows, is secured to the vehicle, and within the tubular member is a slidable red or otherwise suitably coloured lamp provided with operating means whereby it may be projected into or withdrawn from the housing and further provided with a switch whereby it is caused to be energized when it is projected into the housing.

The windows may be in the form of lenses to concentrate the rays toward the front and rear.

In order that the invention may be the more clearly understood however I will now describe it with reference to the accompanying drawing in which:

Fig. 1 is a sectional plan of the invention constructed according to its preferred form. The lamp is shown in its non-indicating position.

Fig. 2 is a view similar to Fig. 1 but showing the lamp in its indicating position as when a turn is about to be made.

Fig. 3 is a central section of the slidable lamp-holding means in which is incorporated a switch which causes the lamp to be energized when it is moved to its indicating position.

Fig. 4 is a plan of the invention showing my indicator applied to the side of a motor vehicle, showing suitable operating means, the operating means being mounted upon the instrument board, which instrument board and the side panel of the vehicle are shown in section. This figure is drawn to a smaller scale than Figs. 1 to 3.

Fig. 5 is a sectional side elevation of the operating means drawn to the same scale as Fig. 4, and Fig. 6 is a central section of a housing in which the windows are of plain glass. This figure is to the same scale as Figs. 1 to 3.

The tubular member 1 is secured to the side panel 2 by means of a flange 3. This flange may be supplied in different angles to suit any particular portion of the body or mudguard.

Secured upon the outer end of the tubular member 1 is the housing 4 which has front and back uncoloured windows 5 and 6 respectively. The windows are preferably in the form of lenses as shown in Figs. 1, 2 and 4, so that they project a beam to front and rear but they may be plain as shown at 7 and 8 in Fig. 6. Preferably the windows are of clear glass but a translucent material may be used.

The lamp 10 within the member 1 is held in a socket 11 and the central electrode is in engagement with the usual type of spring contact 12 which is insulated from the socket 11.

The socket 11 is secured within a sleeve 14 which is slidable in the tubular member 1 but the extent of its movement is limited by set screws 15 which project into the tubular member and engage the slots 16 in the sleeve.

A switch member 18 is made slidable within the sleeve 14 but its movement is limited by a pin 19 on the sleeve engaging a slot in the switch member. A spring 20 projects the member 18 outwards. Within the switch member 18 is secured an insulated pin 21 to the outer end of which the one electrical connection 22 is secured. This connection leads to a battery 24. The return is through the chassis and the tubular member 1. Also secured to the member 18 is a rod 23 by means of which the member 18 and through the spring 20 the sleeve 14 the lamp socket 11 and the lamp 10 are moved to the indicating and non-indicating positions as desired.

The operating means comprise a lever arm 25 to which the rod 23 is pivoted, the arm 25 being secured to a spindle 26 which has secured to it a hand lever 27. The spindle is supported in a bearing member 28 attached to the instrument board 29 or elsewhere. A toothed disc 30 slidable but not rotatable upon the spindle 26 is held by a spring 31 in contact with a notched disc 32 rigidly secured to the bearing member 28, the tooth being arranged to engage in the notch when the lamp is in its non-indicating position and to hold the lamp against accidental displacement. A spring 33 between the lever arm 25 and the instrument board 29 serves to return the lamp to its non-indicating position so soon as the operating force is removed from the hand lever 27. The spring 33 may, however, be omitted.

It will be understood that in place of the lever and rod connection for operating the lamp a Bowden wire or similar arrangement may be used. Also the switch for the light may be replaced by any switch of usual or suitable construction connected to operate in unison with the lamp movement. I have shown the device attached to the body panel adjacent to the driver's seat but it may be placed elsewhere on the body or on one of the mudguards.

Normally the lamp 10 lies within the tubular member 1 clear of the housing 4. In operation when the hand lever 27 is moved from the non-indicating to the indicating position the switch member 18 moves outward carrying with it the sleeve 14 and the lamp 10, the push to the sleeve being effected through the spring 20. When the lamp 10 reaches its position in the centre of the housing 4 and is in line with the windows 5 and 6 therein the movement of the sleeve is arrested by the ends of the slots 16 contacting with the set screws 15. Further movement of the hand lever 27 then causes compression of the spring 20, and the pin 21 to which the one electrical connection 22 is secured moves up with the switch member 18 and contacts with the spring contact 12. This causes the circuit to be completed through the lamp, the return being effected through the lamp socket 11 the sleeve 14 and the tubular member 1 to the vehicle chassis. In the event of the vehicle having a two-wire electrical system a double contact socket would be used in place of the socket 11 and the one contact would be directly connected to the common lead of the lighting system. While the lamp is positioned in the housing 4 and is energized it projects a beam of coloured light to the front and rear, such beam being readily visible to approaching or following motorists or to pedestrians or others. When the actuating force is removed from the hand lever 27 or when the lever is returned to its normal position (according respectively to whether the return spring 33 is or is not used) the spring 20 first of all moves the switch member 18 away from the socket 11, breaking the contact between the pin 21 and the spring contact 12 and so breaking the electrical circuit and switching off the lamp 10. Continued movement of the hand lever 27 draws the lamp 10 and its carrying means back into the tubular member 1 and the warning colour is not visible under any conditions even should the light of a passing or following vehicle shine into or through the housing 4. As the lamp and the moving parts are not at any time projected from out of the enclosing casing or the housing there is no external opening through which rain or dust or the like can enter and affect the working parts.

I claim:

1. In a direction indicator for motor vehicles, the combination of a tubular member comprising at its outer end a housing end to accommodate front and rear lenses, means to attach the member to the vehicle, a socket in said tubular member provided with a lamp, means for moving the lamp and socket from concealed position within the tubular member to a position intermediate the said front and rear lenses within the housing, a battery circuit connected to said lamp and a switch arranged in said circuit.

2. In a direction indicator for motor vehicles, the combination of a tubular member comprising at its outer end a housing to accommodate front and rear lenses, means to attach the member to the vehicle, a socket, a sleeve for the socket slidably mounted in said tubular member, a lamp in said socket, means limiting the movement of the sleeve, a switch comprising a stationary contact mounted in the sleeve connected to the center terminal of the lamp, and a movable contact mounted in the sleeve having limited movement therein and being normally spaced from the stationary contact by a spring, means for moving the movable contact into engagement with the stationary contact and upon continued movement cooperating with the sleeve to position the lamp within the housing between the lenses, and an electric circuit including a battery and the said lamp and the switch.

JOHN NELSON HASSE.